Dec. 23, 1958 C. F. AULT 2,866,091

PULSE PROCESSING SYSTEM

Filed Dec. 29, 1953

Inventor:
Cyrus F. Ault,
by Charles M. Hutchins
His Attorney.

United States Patent Office 2,866,091

Patented Dec. 23, 1958

2,866,091

PULSE PROCESSING SYSTEM

Cyrus F. Ault, Clifton, N. J., assignor to General Electric Company, a corporation of New York Application December 29, 1953, Serial No. 400,990

14 Claims. (Cl. 250—27)

Figure 1:
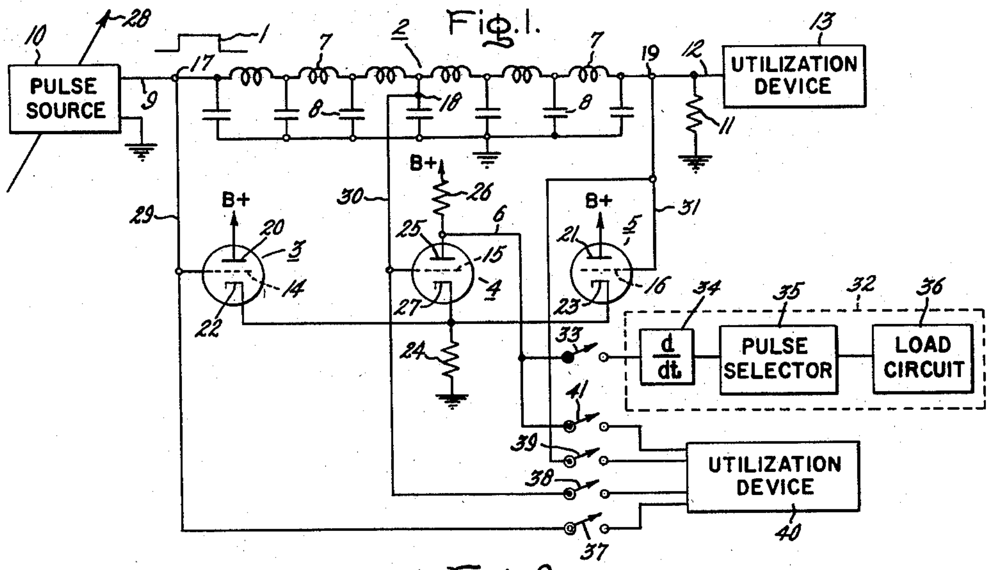

This invention relates to pulse processing circuits and particularly to the type adapted to produce an output pulse having a characteristic variable in accordance with the width of the applied pulse.

In systems operating in response to applied timing or synchronizing pulses for controlling processes, such as computation or mensuration, the need often arises for selecting applied pulses falling within an acceptable range of widths and rejecting all others. Also it is often desired that a trigger signal be generated which is delayed in time with respect to a reference time by an accurate amount in order to effect proper control. Unfortunately prior arrangements for supplying these functions have been found to be relatively complex and unstable and limited in their capability to accommodate a wide range of pulse widths.

It is the object of this invention to provide an improved pulse processing circuit.

Another object of the invention is to provide an arrangement for discriminating against pulses on the basis of their width.

Another object of this invention is to provide an arrangement for selecting pulses having a width within predetermined limits.

Another object of this invention is to provide an arrangement for generating a signal whenever a pulse is received having an acceptable pulse width.

Another object of my invention is to provide an arrangement for generating a delayed signal pulse when the width of an applied pulse is acceptable within prescribed limits.

Another object of my invention is to provide an improved pulse delay circuit.

Another object of this invention is to provide an arrangement for generating a signal having a predetermined time delay with respect to a reference time.

A further object of this invention is to provide an arrangement for generating a signal delayed with respect to a reference time by an amount dependent on the width of the applied signal.

In a particular application of the invention to a pulse width discriminator system, square waves of a predetermined duration are required to be sensed as to width and a control signal generated when the square waves are acceptable. In accordance with the invention each input square wave is caused to travel down a length of transmission delay line. As the wave travels down the line, it affects the conducting status of amplifying devices connected to spaced points along the line. To achieve a desired operation of the system, the amplifying devices are arranged to further effect the conducting status of each other by appropriate interconnections. The result is that a control signal is developed only when the input square waves are of an acceptable width.

Figure 2:
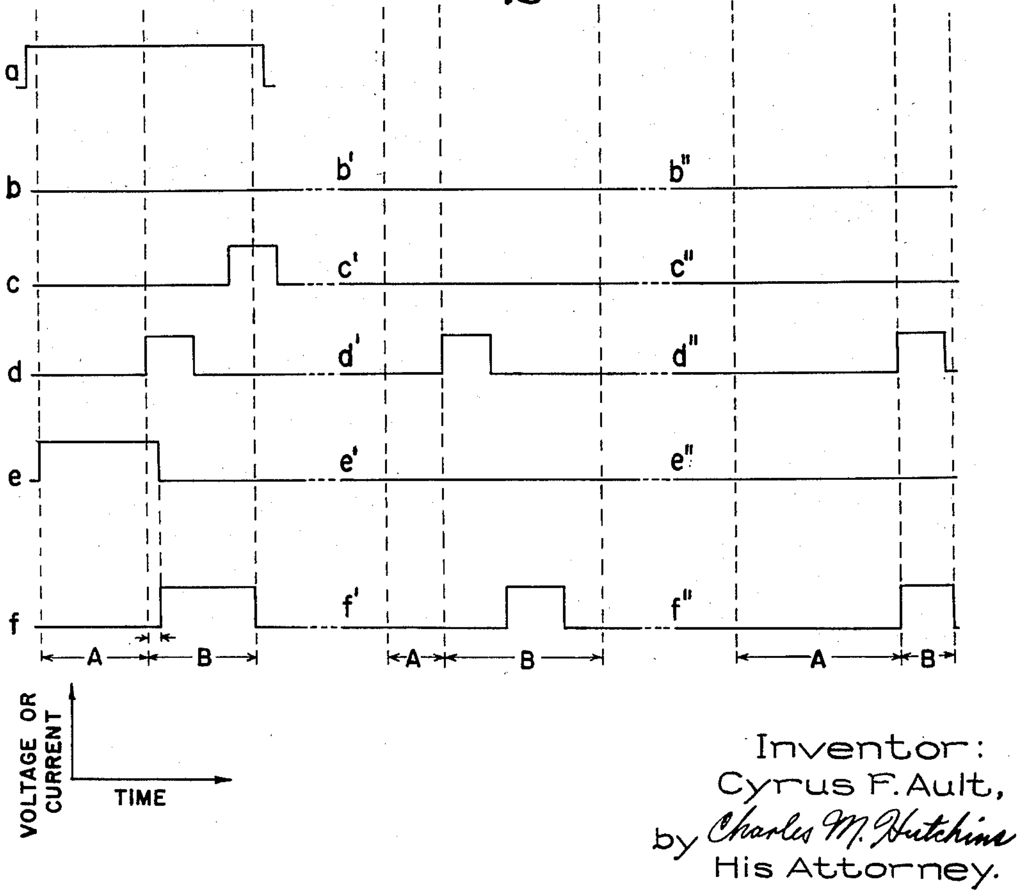

The features of this invention which are believed to be novel are set forth with particularity in the appended claims. The invention itself, however, both as to its organization and methods of operations, together with further objects and advantages thereof may best be understood by reference to the following description when taken in connection with the accompanying drawing wherein:

Fig. 1 is a circuit diagram of an embodiment of the invention and Fig. 2 is a set of wave forms useful in explaining the operation of the circuit diagram of Fig. 1.

The following description of an electrical circuit embodying the invention, certain pulse lengths or widths timing intervals and time constants are assigned to various portions of the system in order to facilitate an understanding of its operation. It is to be understood, however, that such assignments are purely by the way of example and are not to be construed in any way as limiting the scope of the invention.

Referring to Fig. 1 there is shown an electrical circuit arrangement for sensing the length of a positive going square wave 1 or for developing a control signal having wave characteristics dependent upon the width of the square wave. Briefly, the circuit arrangement involves the use of an electrical delay line 2 for propogating the square wave 1 such that it successively energizes electron discharge devices 3, 4, and 5 connected to spaced points along the line. The discharge devices 3, 4, and 5 are further interconnected in a manner permitting the device 4 to yield an output signal at lead 6 only when the applied wave 1 is within a predetermined range of widths.

Referring to Fig. 1 in detail, the electrical pulse transmission delay line 2 comprises inductive and capacitive components 7 and 8. These components may be of the lumped or distributed variety. It merely is necessary that the transmission line permit the propogation of a pulse such as 1 with an acceptable minimum of attenuation. The pulse 1 when applied over lead 9 from source 10 travels down the line at a finite rate determined by the line parameters. If the line is properly terminated in a load circuit such as the resistance 11, the wave is completely absorbed in the terminating load circuit. If further use is required of the delayed pulse available at the output lead 12, element 11 may comprise a coupling circuit for supplying the pulse to a delayed pulse utilization device 13.

In order to select pulses propogated down the line which are of less than predetermined width, amplifying devices such as the electron discharge devices 3, 4, and 5 are provided. Each of these devices comprise an input electrode 14, 15 or 16, connected to respective, spaced points 17, 18 or 19 along the line 2. The anode or output electrodes 20 and 21 of the devices 14 and 16 are connected directly to a source of positive potential B+ while their cathodes 22 and 23 are connected through a common circuit such as load resistor 24 to ground. Thus devices 3 and 5 operate effectively as cathode followers. The device 4 has its anode electrode 25 connected through a load resistor 26 to B+ and its cathode 27 however, is connected through the common load resistor 24 to ground. In the absence of any signal applied to any of the control electrodes, devices 3 and 4 are conducting lightly such that their anode-cathode current flowing through the resistor 24 cause the device 4 to be normally cut off.

For purposes of the initial explanation, it is assumed that the delay line portion between points 17 and 18 is identical to that between points 18 and 19, or that it introduces the same delay within these two intervals, and that the pulse 1 available from source 10 has a width, determined by the pulse width control setting of selector 28, which is less than the electrical length of either of the two line portions.

As the leading edge of the positive pulse 1 enters the delay line at point 17, it is also applied over lead 29 to the control electrode of device 3. The positive pulse causes device 3 to conduct sufficiently heavily to raise the positive bias at the cathode of device 4 by virtue of the common cathode load resistor, and maintain device 4 cut-off. Since the pulse 1 is assumed to be shorter in width than the length of the delay line between points 17 and 18, the leading edge of pulse 1 arrives at point 18 after its trailing edge has left point 17. The positive pulse at point 18 is applied over lead 30 to the control electrode 15, overcoming the normal cut-off bias supplied by devices 3 and 5 by way of the common load resistor 24 and causing device 4 to conduct. Device 4 conducts until the trailing edge of the pulse 1 has passed point 18 whereupon device 4 again is cut off by the bias supplied by devices 3 and 5. The positive pulse upon arrival at point 19 is applied over lead 31 to the control electrode of device 5 causing it to conduct more heavily. The heavier conduction of device 5 has no further effect on device 4 since it is already cut off by the normal conduction of devices 3 and 5. The conduction of the device 4 during passage of the pulse 1 down line 2 results in an output signal being developed at the anode electrode of device 4 for coupling to a utilization circuit 32 by closing switch 33. The pulse width discrimination properties of the arrangement of Figure 1 are achieved by the fact that device 4 can conduct to yield an output signal or pulse, only if the applied pulse 1 has a width less than the electrical length of the line between points 17 and 19 such that for a period of time device 4 has its control electrode energized by the applied pulse without devices 3 or 5 having their respective control electrodes also energized at the same time.

If on the other hand the pulse 1 is assumed to be longer in width than the portion of the delay line portions contained between points 17 and 19, then at all times when a portion of the applied pulse wave form is energizing the control electrode 15 of device 4, it is also energizing one of the control electrodes 14 or 16 of devices 3 and 5. The consequent heavier conduction of devices 3 or 5 supplies sufficient bias by way of the cathode load resistor 24 to prevent device 4 from conducting.

The pulse width discriminating properties of the arrangement of Figure 1 can readily be seen by reference to Figure 2, illustrating the output current pulse as received from device 4 for various applied pulse widths and transmission line lengths. In Fig. 2 time is plotted as ordinate and applied pulse voltage or output pulse current as abscissa. Figure 2*a* shows a pulse width which is greater than the combined length of the two portions A and B of the transmission line 2. The portion A corresponds to the length of line between points 17 and 18 while the portion B corresponds to the length between points 18 and 19. For this condition, it is seen in Fig. 2*b* that no output current pulse is derived since at no time is the device 4 energized by a portion of the applied pulse without either devices 3 or 5 also being energized. This result is true regardless of the relative lengths of the line portions A and B as shown in Figs. 2*b'* and 2*b''*.

Fig. 2*c* shows an applied pulse width which is less than either of the two delay lines portions A and B. An output pulse is derived from device 4 for each of the delay line conditions 2*d'* and 2*d''*. Similarly Fig. 2*e* shows an output pulse derived when the pulse width is less than the total length of the line $A+B$ but greater than one of the line portions for the transmission line condition 2*f'* and 2*f''*.

Besides discriminating between applied pulses on the basis of pulse width, Fig. 2 indicates the capability of the arrangement of Fig. 1 to produce an output pulse from device 4 whose leading or trailing edge is delayed differently from a reference time in accordance with the relative lengths of the portions of the delay line $A+B$ and the width of the applied pulse 1. The following table indicates some of the various time delays capable of attainment by the arrangement of Fig. 1.

DELAY OF OUTPUT PULSE WITH RESPECT TO—

| Pulse Width, W | Point 17 | | Point 18 | | Point 19 | |
|---|---|---|---|---|---|---|
| | LE | TE | LE | TE | LE | TE |
| $W>A+B$ | — | — | — | — | — | — |
| $W<A$ or $B$ | A | $A+W$ | O | W | −B | $W-B$ |
| $W>A$ or $B$ and $W<A+B$ | W | $A+B$ | $W-A$ | B | $W-A-B$ | O |
| $W>A<B$ | W | $A+W$ | $W-A$ | W | $W-A-B$ | $W-B$ |
| $W>B<A$ | A | $A+B$ | O | B | −B | O |

In the table there is shown the relative time separation between the arrival of the leading and trailing edges (L. E. and T. E.) of the output pulse available at lead 6, and the arirval of the leading edge of the input pulse 1 at the various points 17, 18, and 19 in the delay line. It should be noted that for the condition where the applied pulse width W is greater in length than the A portion of the delay line, which in turn is less than the B portion of the delay line, (Fig. 2*f''*) the leading edge of the output pulse from device 4 is delayed by its own length with respect to the time the pulse is first launched down the delay line, while its trailing edge is delayed by an amount of time equivalent to the sum of the length of the pulse width W plus the length of the A portion of the line. It should be noted that these delay relationships may be maintained for changes in length of the applied pulse within prescribed limits despite the fact that the delay line length remains fixed. This capability of accommodating various lengths pulses with the same delay line can easily be recognized by studying the above chart. This is a useful feature where a constant delay, say $A+B$ is to be provided by single circuit arrangement for pulses of variable or changeable widths. Similarly it is often desirable that a pair of pulses of fixed separation be provided despite changes in the width of the pulses. The present invention is capable of serving all of these functions.

In order to make use of the output pulse, the resultant signal developed at output electrode 25 is coupled by means of switch 33 to the utilization device 32. If use is to be made of the time delays introduced because of changes in the applied pulse width, the utilization circuit may comprise a differentiating circuit 34 which produces a pair of narrow spike pulses coincident with the leading and trailing edges of the delayed output signal and having different polarity. The differentiated pulses available from 34 are then applied to a polarity selector circuit 35 which is biased to pass either the positive or negative differentiated pulses to a load circuit 36 for utilization.

If the delay relationship between the output signal available at anode 25 and the applied pulse in passing points 17, 18 or 19 is required, switches 37, 38, and 39 may be selectively closed to couple the applied pulse when it reaches the points 17, 18 or 19, to the utilization device 40 together with signal available from switch 41. Device 40 may comprise a control circuit with predetermined on-off periods established by any combination of the applied pulses and signals.

While a specific embodiment has been shown and described, it will of course be understood that various modifications may yet be devised by those skilled in the art which will embody the principles of the invention and found in the true spirit and scope thereof.

What I claim and desire to secure by Letters Patent of the United States is:

1. An energy signal delay line, a plurality of energy signal detecting devices each coupled to a respective spaced point in and along said line, means for propagating an energy signal down said line to normally successively effect the operation of each of said devices, and means interconnecting said devices to cause the operation of one of said devices to overcome any normal effect by said propagated signal on a second one of said devices, and means for producing an output signal in response to the operation of said second device.

2. A distributed electrical pulse delay line, a plurality of controllable electronic devices connected to spaced points in and along said line, means for propagating an electrical pulse down said line to normally successively alter the conducting status of each of said devices, and circuits interconnecting said devices to cause the conducting status of one of said devices to overcome any normal alteration of the conducting status of a second one of said devices by said propagated pulse, and means for producing an output signal in response to the altered conducting status of said second device.

3. An arrangement comprising an electrical pulse delay line, said line comprising an input circuit at one end, and an output circuit at the other end, thereof, first, second and third spaced points in said line located respectively in succession along said line between said input and output circuits, means responsive to the time occurrence at each of said spaced points of a pulse being propagated along said line between said input and output circuits to produce an output signal only when said propagated pulse is of a length such that it appears at the second point without also appearing simultaneously at said first and third points.

4. An arrangement comprising an electrical pulse delay line, said line comprising an input circuit at one end and an output circuit at the other end thereof, first, second and third spaced points in said line located respectively in succession along said line between said input and output circuits, means responsive to a pulse being propagated along said line between said input and output circuits to produce an output signal only when said propagated pulse is of a length such that it appears at the second point without also appearing simultaneously at said first and third points, said means responsive to the length of said propagated pulse relative to the amount of delay in said line between said points to cause said output signal to be delayed a corresponding amount.

5. An arrangement comprising an electrical pulse delay line, said delay line comprising an input circuit at one end and an output circuit at the other end thereof, first, second, and third spaced points in said line located respectively in succession along said line between said input and output circuits, a first, second, and third controllable electronic device connected to a respective one of said first, second, and third points, each of said devices normally responsive to a pulse being propagated between said input and output circuits and appearing at its respective spaced point to become operative and produce an output signal, said second device responsive to the output signal developed by said first or third device to not become operative in response to said propagated pulse for the duration of said last named signal.

6. An arrangement comprising an energy signal delay line comprising an input and an output end, first, second and third spaced points in said line located respectively in succession along said line between said input and output ends, means responsive to an energy signal being propagated along said line between said input and output ends for producing an output signal only when said propagated signal is of a duration such that it appears at the second point without also appearing at said first and third points, said means responsive to the duration of said propagated signal relative to the amount of delay in said line to cause said output signal to be delayed a corresponding amount.

7. An arrangement comprising an electrical pulse delay line, said delay line comprising an input circuit at one end and an output circuit at the other end thereof, first, second and third spaced points in said line located respectively in succession along said line between said input and output circuits, a first, second, and third controllable electronic device connected to a respective one of said first, second, and third points, each of said devices normally responsive to a pulse being propagated between said input and output circuits and appearing at its respective spaced point to become operative and produce an output signal for the duration of said pulse appearance at its respective spaced point, said second device responsive to the output signal developed by said first or said third device to become inoperative such that said second device is able to respond to a propagated pulse appearing at its respective spaced point and produce an output signal only when said propagated pulse does not simultaneously appear at said first and third points, said second device responsive to the duration of said first and third device output signals to cause said second device output signal to be delayed by a corresponding amount.

8. A pulse delay line, a first, second and third controllable device each comprising an input circuit and an output circuit, means connecting the input circuits of said first, second and third devices to successively spaced points along said line to enable a pulse propagated down said line to normally successively effect the operation of each of said devices, means connecting the output circuits of said first and third devices to the input circuit of said second device to overcome control of the operation of said second device solely by said propagated pulse and to enable the operation of said second device to be controlled by the operation of said first and third devices.

9. An electricaal pulse delay line, a first, second and third controllable electronic device each of said devices comprising a control electrode, anode electrode and a cathode electrode, means connecting the control electrodes of said first and third devices to spaced points along said line, means connecting the control electrode of said second device to a point on said line intermediate said spaced points, means connecting the cathode electrodes of each of said devices through a common load resistor to ground, means connecting the anode electrodes of said first and third devices to B+, means connecting the anode electrode of said second device to B+ through a load resistor, means for propagating a pulse down said line to successively energize the control electrodes of said first second and third devices, said first and third devices in the absence of an applied signal normally conducting lightly sufficiently to bias the second device to cut off, said second device responsive to a propagated pulse energizing its control electrode in the absence of a portion of the same pulse simultaneously energizing the control electrodes of said first and third devices to conduct and produce an output signal at its anode electrode, said first and third devices responsive to a propagated pulse energizing their control electrodes to bias said second device to cut-off even with a portion of the same pulse energizing the control electrode of said second device, and means for utilizing the output signal developed at the anode electrode of said second device.

10. An electrical pulse transmission line, a first, second and third controllable electronic device, each of said devices comprising an input circuit and an output circuit, means for connecting the input circuits of said first, second and third devices to respective, successively spaced points in and along said line, means for propagating an electrical pulse down said line to successively energize said input circuits and increase the conducting status of each of said devices, the input and output circuits of each of said devices comprising a common load resistance, such that increased conduction of said first or third device biases the second device to cut off despite the coincident energization of the input circuit of said second device by said propagated pulse, and means responsive to increased conduction of said second device to produce an output signal.

11. An arrangement comprising an electrical pulse delay line, said delay line comprising an input circuit at one end and an output circuit at the other end thereof, first, second and third spaced points in said line located respectively in succession along said line between said input and output circuits, a first, second, and third controllable electronic device connected to a respective one of said first, second, and third points, each of said devices normally responsive to a pulse being propagated between said input and output circuits and appearing at its respective spaced point to become operative and produce an output signal for the duration of said pulse appearance at its respective spaced point, said second device responsive to the output signal developed by said first or said third device to become inoperative such that said second device is able to respond to a propagated pulse appearing at its respective spaced point and produce an output signal only when said propagated pulse does not simultaneously appear at said first or third spaced point, said second device responsive to the duration of said first and third device output signals to cause said second device output signal to be delayed by a corresponding amount.

12. An arrangement comprising an energy signal delay line, a plurality of first controllable devices, a second controllable device, each of said devices comprising an input circuit and an output circuit, means connecting the input circuits of each said devices to respective successively spaced points along said line, said devices responsive to an energy signal propogated along said line to normally become successively operated by said signal, means connecting the output circuits of each of said first devices to the input circuit of said second device, said second device responsive to the time occurrence at its input circuit and at each of the input circuits of said first devices of said energy signal being propagated along said line to produce an output signal only when there is no time overlap of the time occurrence of said signal at the input circuit of said second device with that of said signal at the input circuits of said first devices.

13. An arrangement comprising an energy signal delay line, a plurality of first controllable devices, a second controllable device, means electrically coupling each of said devices to respective successively spaced points along said line, said devices responsive to an energy signal propagated along said line to normally become successively operated by said signal, said second device responsive to the operation of said first devices to produce an output signal only when there is no time overlap of the normal operation of said second device with that of the normal operation of said first devices.

14. An arrangement comprising an energy signal delay line, a plurality of first controllable devices, a second controllable device, means electrically coupling each of said devices to respective successively spaced points along said line, said devices responsive to an energy signal propagated along said line to normally become successively operated by said signal, said second device responsive to the operation of said first devices to produce an output signal only when there is no time overlap of the normal operation of said second device with that of the normal operation of said first devices, and means responsive to said output signal and to the operation of predetermined ones of said first devices to produce a second output signal.

References Cited in the file of this patent

UNITED STATES PATENTS

| | | |
|---|---|---|
| 2,211,942 | White | Aug. 20, 1940 |
| 2,212,173 | Wheeler et al. | Aug. 20, 1940 |
| 2,212,967 | White | Aug. 27, 1940 |
| 2,265,996 | Blumlein | Dec. 16, 1940 |
| 2,706,810 | Jacobsen | Apr. 19, 1955 |